(12) United States Patent
Major et al.

(10) Patent No.: US 7,614,682 B1
(45) Date of Patent: Nov. 10, 2009

(54) STEERING ASSEMBLY HVAC SYSTEM

(75) Inventors: Gregory A. Major, Farmington Hills, MI (US); Michael E. Nishek, Ortonville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/352,724

(22) Filed: Jan. 13, 2009

(51) Int. Cl.
*B60J 9/00* (2006.01)
(52) U.S. Cl. ....................... 296/154; 454/152
(58) Field of Classification Search ................. 296/208; 454/152
See application file for complete search history.

(56) References Cited

U.S. PATENT DOCUMENTS

2006/0121843 A1* 6/2006 Koval .......................... 454/152

* cited by examiner

*Primary Examiner*—Lori L Lyjak

(57) ABSTRACT

A steering assembly and HVAC system, and method of operation, for a vehicle is disclosed. The system may comprise a steering column assembly including a steering column located within a cowl; a steering wheel assembly including a hub operatively engaging the steering column; and a steering assembly HVAC system including a steering column HVAC duct extending along the cowl and having an air outlet adjacent to the hub, whereby air will flow through the steering column HVAC duct and through the air outlet past the hub.

14 Claims, 3 Drawing Sheets

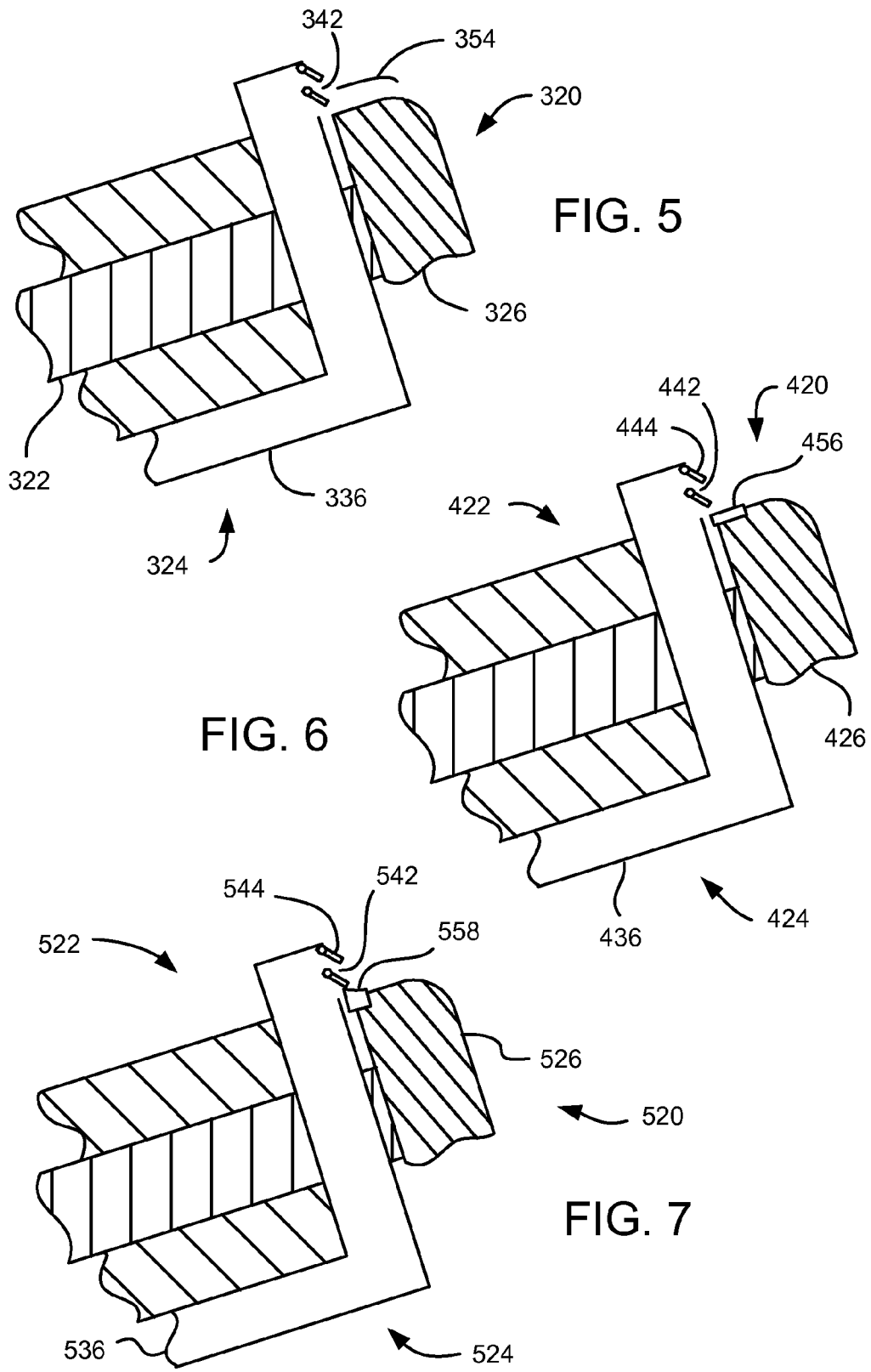

STEERING ASSEMBLY HVAC SYSTEM

BACKGROUND OF INVENTION

The present invention relates generally to vehicle steering wheel assemblies and heating, ventilation and air conditioning (HVAC) systems.

In automotive vehicles, it is desirable to provide adequate flow of cooled (air conditioned) air and ventilation air to the vehicle operator. Typically, vents for air conditioned and ventilation air are located on the instrument panel. While these vents work adequately for overall cooling of the passenger compartment, some vehicle operators may want the cool air to blow directly on their bodies or faces. For a front seat passenger who is not operating the vehicle, this is easily accomplished. However, for the vehicle operator, the steering wheel assembly may block much of this flow. The operator's hands on the steering wheel may increase this blockage while making the operator's hands cold. This flow blockage may be more pronounced in small vehicles where the possible locations for the vents on the instrument panel are more limited.

SUMMARY OF INVENTION

An embodiment contemplates a steering assembly and HVAC system for a vehicle. The system may comprise a steering column assembly including a steering column located within a cowl; a steering wheel assembly including a hub operatively engaging the steering column; and a steering assembly HVAC system including a steering column HVAC duct extending along the cowl and having an air outlet adjacent to the hub, whereby air will flow through the steering column HVAC duct and through the air outlet past the hub.

An embodiment contemplates a method of providing HVAC air flow to a vehicle operator, the method comprising the steps of: directing the air flow through a steering column HVAC duct extending along a steering column assembly; directing the air flow from the steering column HVAC duct through an air outlet located adjacent to a hub of a steering wheel assembly; and redirecting a direction of air flow from the air outlet by directing the air flow through a louver mounted adjacent to the air outlet.

An advantage of an embodiment is that a steering assembly HVAC system allows conditioned air to be directed to a vehicle operator's face, chest and/or lap without being continually obstructed by a steering wheel assembly or the vehicle operator's hands. Thus, the vehicle operator is more comfortable while operating the vehicle.

BRIEF DESCRIPTION OF DRAWINGS

FIG. 5 is a schematic view similar to FIG. 4, but illustrating a fourth embodiment.

FIG. 6 is a schematic view similar to FIG. 4, but illustrating a fifth embodiment.

FIG. 7 is a schematic view similar to FIG. 4, but illustrating a sixth embodiment.

DETAILED DESCRIPTION

Figure 1:
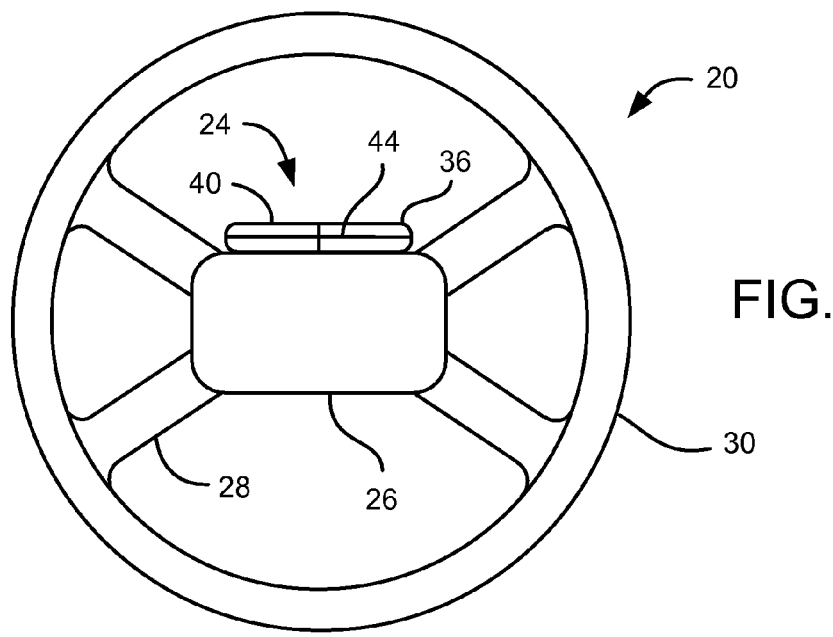
FIG. 1 is a schematic view of a steering assembly for a vehicle.
Figure 2:
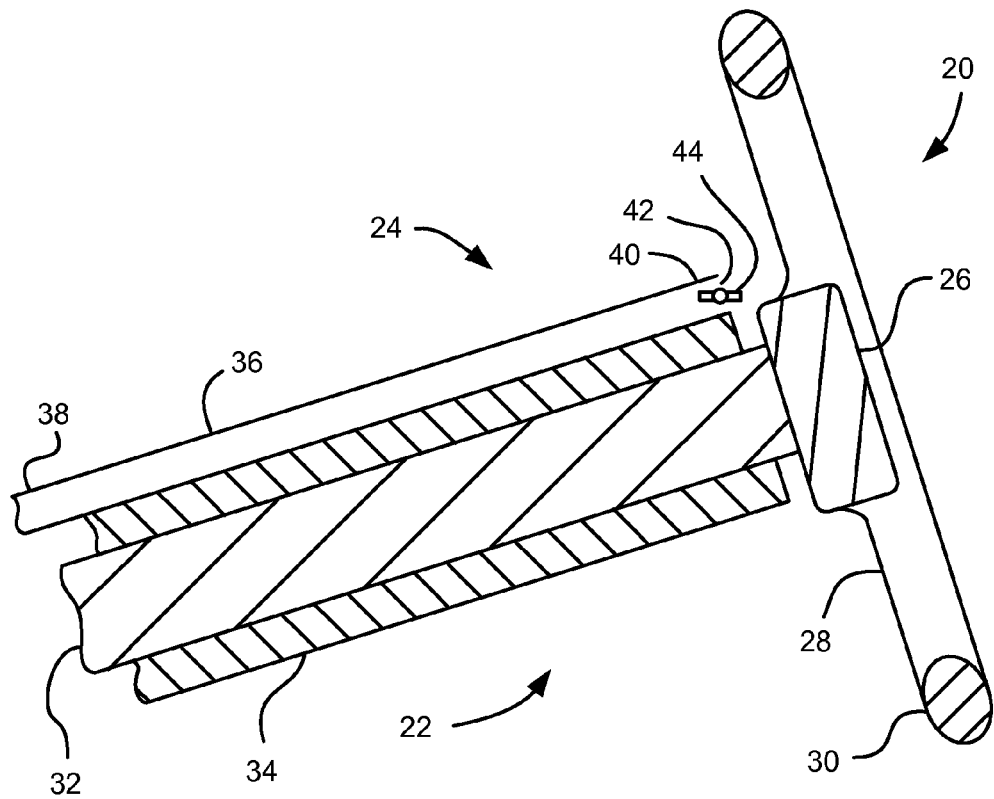
FIG. 2 is a schematic view, in partial section, of the steering assembly of FIG. 1.

FIGS. 1-2 illustrate a steering wheel assembly 20 operatively engaging a steering column assembly 22 that includes a steering assembly HVAC system 24. The steering wheel assembly 20 may have a steering wheel hub/airbag assembly 26, with steering wheel spokes 28 extending therefrom that attach at radially outer ends to a steering wheel rim 30.

The steering column assembly 22 may include a steering column 32 that connects to and is actuated by the steering wheel assembly 20 and a steering column cowl 34 surrounding the steering column 32. The steering column assembly 22 may be a fixed type of assembly or may allow for tilting and/or telescoping, as is known to those skilled in the art.

The steering wheel HVAC system 24 has a steering column HVAC duct 36 that extends along the outer surface of the steering column cowl 34 along the top of the cowl 34. A first end 38 of the steering column HVAC duct 36 operatively engages and receives air flow from an HVAC module (not shown). The steering column HVAC duct 36 may interact with the HVAC module to receive air flow when HVAC controls (not shown) are set to force air through upper vents (not shown) on an instrument panel (not shown) or the HVAC module and HVAC controls may have a separate setting specifically for selectively directing air to the steering column HVAC duct 36.

If the steering column assembly 22 is one that allows for tilting and/or telescoping, then the steering column HVAC duct 36 may include a flexible portion that will allow the duct 36 to accommodate the tilting and/or telescoping. Such a flexible portion, for example, may have walls with an accordion shape (not shown) and be made of an elastic material. If the steering column assembly 22 only telescopes, then the duct 36 may simply have a portion with one section telescopically received in another section (not shown) that allows for axial sliding between the two, or the duct 36 may be stationary with the steering column assembly 22 telescoping independently from the duct 36.

A second end 40 of the steering column duct 36 includes an air outlet 42 that is adjacent to and forward of the steering wheel assembly 20 and is above the steering wheel hub 26. A pair of louvers 44, which may be fixed or movable, may be located in the air outlet 42 to allow for redirection of air flowing from the air outlet 42. Each louver in the pair of louvers 44 may be able to move independently, allowing air to be redirected in different directions. Alternatively, a single louver may extend across the air outlet 42.

The operation of the steering assembly HVAC system 24 in conjunction with the steering wheel assembly 20 will now be discussed. As the vehicle is operating, a driver may activate the HVAC controls, requesting air flow through the steering column HVAC duct 36. The air flow is directed by the duct 36 to the air outlet 42. As the air flows through the outlet 42, the louvers 44 may change the direction of some of the air flow. For adjustable louvers 44, then, the air flow may be directed toward a driver's face, upper body and/or lap by pivoting one or both louvers 44. There may be times, when the steering wheel assembly 20 is turned, that the steering wheel hub 26 or spokes 28 redirect some of the flow away from where it is desired. However, for most of the time during typical vehicle operation, the steering wheel assembly 20 is within a small number of degrees of straight travel and so the redirection of air flow for a typical driver will be generally minimal.

Figure 3:
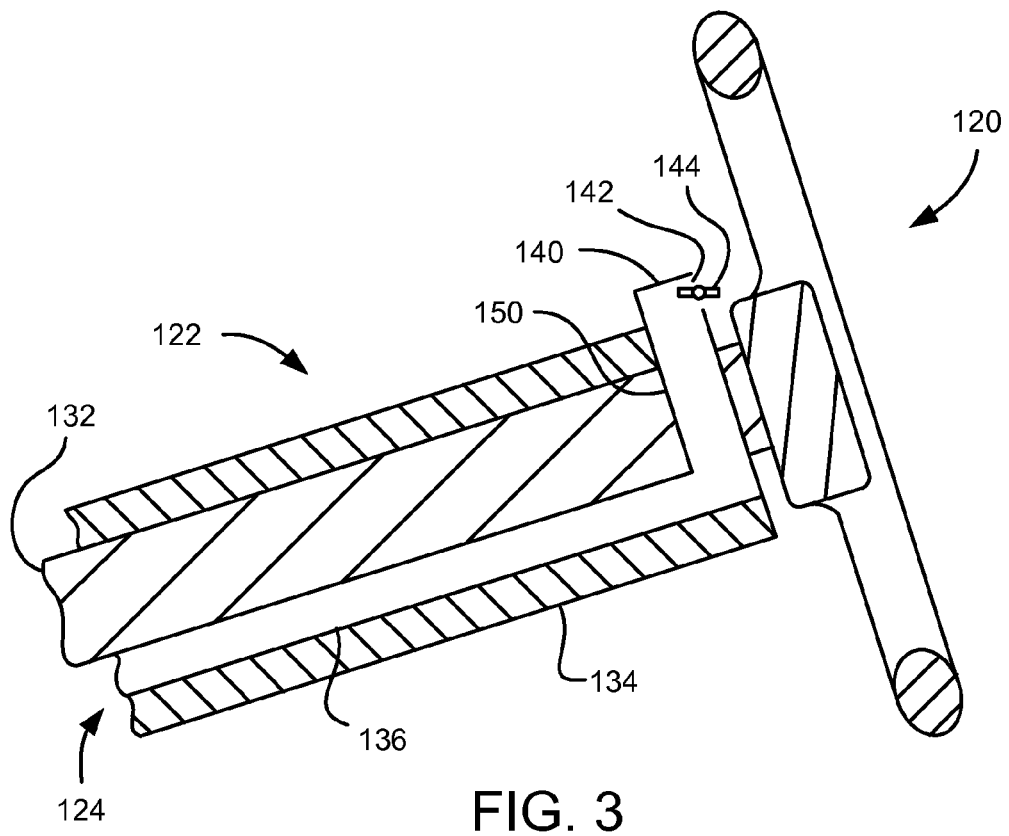
FIG. 3 is a view similar to FIG. 2, but illustrating a second embodiment.

FIG. 3 illustrates a second embodiment. Since this embodiment is similar to the first, similar element numbers will be used for similar elements, but employing 100-series numbers. In this embodiment, the steering wheel assembly 120 and the steering column 132 of the steering column assembly 122 may be the same as in the first embodiment.

The steering assembly HVAC system 124 may include a steering column HVAC duct 136 that now extends along the steering column 132 inside of an enlarged steering column cowl 134. While the duct 136 is shown extending along the bottom of the steering column 132, it may extend along the column at other locations, such as a side of the column 132, instead. The steering column HVAC duct 136 may also include a duct transition portion 150 that extends circumferentially around a portion of the steering column 132 to a second end 140 having an air outlet 142 above the steering column 132. In this embodiment, the louver 144 may be a single louver that extends all of the way across the air outlet 142 and pivots to direct the air flow where desired.

Alternatively, the steering column HVAC duct 136 may extend along the top of the steering column 132, but still inside the steering column cowl 134, reducing or eliminating the duct transition portion.

Figure 4:
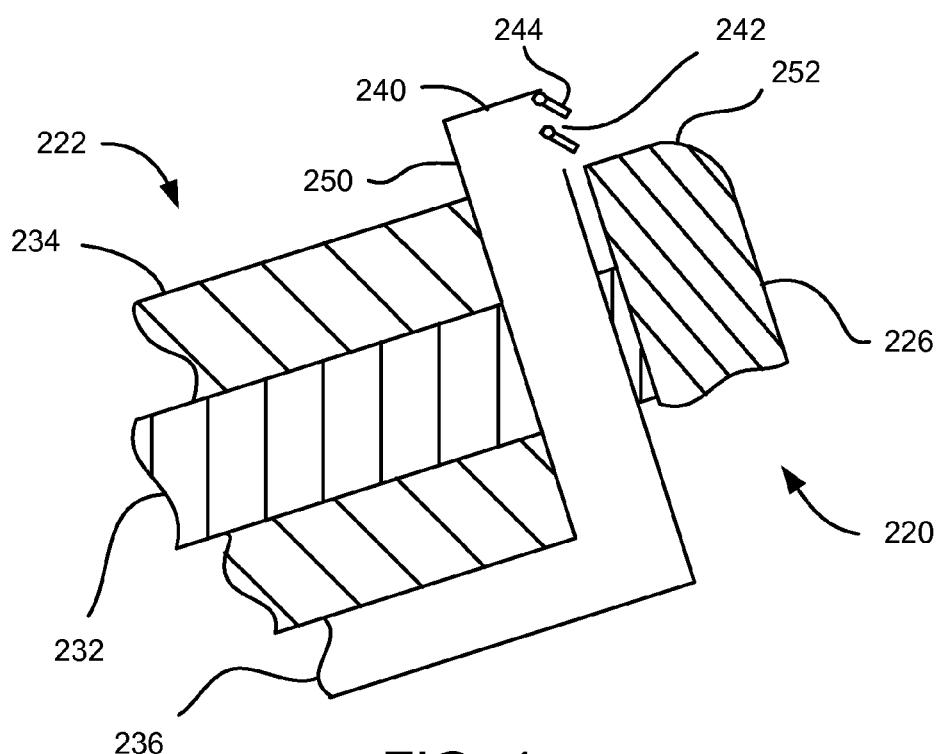
FIG. 4 is a schematic view, in partial section, of a portion of a steering assembly according to a third embodiment.

FIG. 4 illustrates a third embodiment. Since this embodiment is similar to the first, similar element numbers will be used for similar elements, but employing 200-series numbers. In this embodiment, the steering column 232 and steering column cowl 234 of the steering column assembly 222 may be the same as in the first embodiment.

The steering wheel hub 226 of the steering wheel assembly 220 may have an exterior upper surface 252 that is shaped to encourage air flow to attach to this surface of the hub 226 (a Coanda effect). The steering column HVAC duct 236 may extend along an exterior bottom side of the steering column cowl 234 and include a duct transition portion 250 that extends circumferentially around a portion of the steering column 232 to a second end 240 having an air outlet 242 above the steering column 232. In this embodiment, two louvers 244 are mounted in the air outlet 242 and can pivot to redirect the air flow where desired. Directing the air flow downward toward the steering wheel hub 226 may allow the air to be directed down onto a driver's lap.

FIG. 5 illustrates a fourth embodiment. Since this embodiment is similar to the third, similar element numbers will be used for similar elements, but employing 300-series numbers. In this embodiment, the steering column assembly 322 and steering wheel assembly 320 may be the same as in the third embodiment. The steering assembly HVAC system 324 may have a steering column HVAC duct 336 that is the same as in the third embodiment. An air direction vane 354 is mounted to the steering wheel hub 326 above an upper surface of the hub 326 in order to assist in redirecting air flow from the air outlet 342 to a driver's lap or lower body.

FIG. 6 illustrates a fifth embodiment. Since this embodiment is similar to the third, similar element numbers will be used for similar elements, but employing 400-series numbers. In this embodiment, the steering column assembly 422 may be the same as in the third embodiment. The steering assembly HVAC system 424 may have a steering column HVAC duct 436 that is the same as in the third embodiment. A magnet 456 is mounted on top of the steering wheel hub 426 in close proximity to louvers 444, which can pivot and have magnetic properties. Thus, when the steering wheel assembly 422 is within a predetermined number of degrees of its center position, the magnet 456 will repulse the louvers 444, causing them to tilt upward. And, when the steering wheel assembly 420 is turned beyond this predetermined number of degrees, the magnet will not align with the louvers 444, allowing them to fall to mostly close the air outlet 442. In this way, when the steering wheel assembly 420 is turned an amount where the steering wheel hub 426 or steering wheel spokes (not shown in FIG. 6) redirect the air flow, the louvers 444 will be closed.

FIG. 7 illustrates a fifth embodiment. Since this embodiment is similar to the third, similar element numbers will be used for similar elements, but employing 500-series numbers. In this embodiment, the steering column assembly 522 may be the same as in the third embodiment. The steering assembly HVAC system 524 may have a steering column HVAC duct 536 that is the same as in the third embodiment. A contoured surface 558 is mounted on top of the steering wheel hub 526 in close proximity to louvers 544, which pivot in unison. The contoured surface 558 may taper with end ramps at either of its ends. Thus, when the steering wheel assembly 520 is within a predetermined number of degrees of its center position, the contoured surface 558 will contact and lift the louvers 544, causing them to tilt upward. And, when the steering wheel assembly 520 is turned beyond this predetermined number of degrees, the contoured surface 558 will not align with the louvers 544, allowing them to fall, essentially closing the air outlet 542. In this way, when the steering wheel assembly 520 is turned an amount where the steering wheel hub 526 or steering wheel spokes (not shown in FIG. 7) redirect the air flow, the louvers 544 will be closed.

A further alternative of the steering assembly HVAC system may include a duct extension portion and air outlet that rotate with the steering wheel assembly, with an interface to a fixed portion of the steering column HVAC duct that is mounted to the steering column assembly. With such a configuration, the air outlet would not become blocked by the steering wheel hub or spokes during a vehicle turn event. However, the interface between the steering column HVAC duct on the steering column assembly and the duct transition portion that rotates with the steering wheel assembly would add overall complexity to the system.

While certain embodiments of the present invention have been described in detail, those familiar with the art to which this invention relates will recognize various alternative designs and embodiments for practicing the invention as defined by the following claims.

What is claimed is:

1. A steering assembly and HVAC system for a vehicle comprising:
   a steering column assembly including a steering column located within a cowl;
   a steering wheel assembly including a hub operatively engaging the steering column; and
   a steering assembly HVAC system including a steering column HVAC duct extending along the cowl and having an air outlet adjacent to the hub, whereby air will flow through the steering column HVAC duct and through the air outlet past the hub, and wherein the steering column HVAC duct includes a lower portion extending along the cowl below the steering column and a duct transition portion extending circumferentially around a portion of the steering column from the lower portion to the air outlet.

2. The steering assembly and HVAC system of claim 1 wherein the steering column HVAC duct extends along an outer surface of the cowl.

3. The steering assembly and HVAC system of claim 1 wherein the steering column HVAC duct extends between the cowl and the steering column.

4. The steering assembly and HVAC system of claim 1 wherein the steering assembly HVAC system includes a louver mounted in the air outlet that is configured to redirect air flowing through the air outlet.

5. The steering assembly and HVAC system of claim 4 wherein the louver is pivotable relative to the air outlet.

6. The steering assembly and HVAC system of claim 4 including a second louver mounted in the air outlet adjacent to the louver.

7. The steering assembly and HVAC system of claim 1 wherein the steering assembly HVAC system includes an air direction vane extending above the hub adjacent to the air outlet outside of the steering column HVAC duct.

8. The steering assembly and HVAC system of claim 1 including a magnet mounted on the hub and a louver mounted in the air outlet that is pivotable relative to the air outlet and adjacent to the magnet when the steering wheel assembly is located in a centered position, the louver having a magnetic repulsion from the magnet, whereby when the steering wheel assembly is within a predetermined number of degrees from the centered position, the magnet will force the louver to pivot into an open position.

9. The steering assembly and HVAC system of claim 1 including a contoured surface extending from the hub and a louver mounted in the air outlet that is pivotable relative to the air outlet, the louver configured to be lifted to an open position by the contoured surface when the steering wheel assembly is located within a predetermined number of degrees of rotation from a centered position.

10. The steering assembly and HVAC system of claim 1 wherein the steering wheel assembly includes a plurality of spaced, radially extending spokes extending from the hub, and the air outlet is located to direct air between two of the spokes when the steering wheel assembly is in a centered position.

11. A method of providing HVAC air flow to a vehicle operator, the method comprising the steps of:
    (a) directing the air flow through a steering column HVAC duct extending along a steering column assembly;
    (b) directing the air flow from the steering column HVAC duct through an air outlet located adjacent to a hub of a steering wheel assembly;
    (c) redirecting a direction of air flow from the air outlet by directing the air flow through a louver mounted adjacent to the air outlet; and
    (d) redirecting a portion of the air flow from the louver with an air direction vane that redirects the air flow along the hub toward a lap of the vehicle operator.

12. The method of claim 11 including the step of (e) pivoting the louver to an open position by contact with a contoured surface when the steering wheel assembly is located within a predetermined number of degrees from a centered position.

13. The method of claim 11 including the step of (e) pivoting the louver to an open position via a magnetic field when the steering wheel assembly is located within a predetermined number of degrees from a centered position.

14. A steering assembly and HVAC system for a vehicle comprising:
    a steering column assembly including a steering column located within a cowl;
    a steering wheel assembly including a hub operatively engaging the steering column, the hub including a contoured surface extending therefrom; and
    a steering assembly HVAC system including a steering column HVAC duct extending along the cowl and having an air outlet adjacent to the hub and including a louver mounted in the air outlet that is pivotable relative to the air outlet, the louver configured to be lifted to an open position by the contoured surface when the steering wheel assembly is located within a predetermined number of degrees of rotation from a centered position, whereby air will flow through the steering column HVAC duct and through the air outlet past the louver and the hub.

* * * * *